Patented Dec. 9, 1947

2,432,280

UNITED STATES PATENT OFFICE 2,432,280

PROCESS OF FORMING CARBOHYDRATE DERIVATIVES

George V. Caesar, Staten Island, N. Y., assignor to Stein, Hall & Company, Inc., New York, N. Y., a corporation of New York No Drawing. Application February 1, 1944, Serial No. 520,705

18 Claims. (Cl. 260—209)

This invention relates to acid adsorption, and more particularly to a process for the adsorption or elimination of acids from a reaction which liberates acids. The invention includes especially the application of the process for the selective removal of nitric acid from a non-aqueous solution thereof with its anhydride nitrogen pentoxide.

In a large variety of chemical processes, particularly those of acylation, esterification, etherification, etc., an acid is formed as a reaction by-product along with the acylated, esterified, or etherified primary product. The presence of the acid interferes with the course of the reaction and in many instances must be removed in order that the reaction may proceed at the desired rate and to the desired equilibrium point, or in order that side reactions which involve the by-product acid may be eliminated. In these processes it is important not only to remove the acid, but to accomplish this in a manner so as not to neutralize or eliminate the anhydride or other material which is used in the primary reaction.

The removal of acids or acid vapors by some medium which either absorbs, adsorbs or neutralizes the acid is often desirable in commercial processes. Neutralizing agents are frequently not useable because they react with the anhydride or other reactant of the primary process. An adsorbing agent is generally preferable, since it permits the acid to be recovered without neutralization and in a preferable chemical condition. Silica gels, activated carbons, activated aluminas, etc., have been proposed and are more or less effective for the adsorption of acid and acid vapors. In many processes, such as esterification, such adsorption agents is undesirable or ineffective, since they tend to remove not only the acid but also the esterifying agent.

I have discovered that the acids liberated in chemical reactions, as illustrated by those hereinafter described, may be adsorbed by means of a fluoride salt.

It is an object of the invention to selectively adsorb acids formed as a by-product in chemical reactions.

It is an additional object to selectively adsorb or remove such acids utilizing a fluoride salt, and preferably sodium fluoride as the adsorption agent.

More particularly, it is an object of the invention to remove nitric acid selectively when present in a non-aqueous solvent with nitrogen pentoxide in nitration processes.

A further object is the removal of hydrochloric acid, such as formed by the etherification of carbohydrates with halogenated acids or halohydrins.

Still a further object of the invention is the absorption of acids liberated in any of a variety of other processes of acylation, esterification, or etherification, etc., in which the acid is liberated in the process.

The applications of my invention are numerous and two will be described hereinafter as illustrative, namely, the removal of nitric acid formed as a by-product from nitration with nitrogen pentoxide and the removal of hydrochloric acid resulting from the etherification of carbohydrates with a halogenated acid or halohydrin.

I will first describe the invention as applied to the removal of nitric acid formed in nitration.

It is well known that many organic compounds have been subjected to nitration to form nitric esters of nitro compounds having usefulness, for example, as explosives. Among the materials which have been proposed for nitration are, for example, the carbohydrates and polysaccharides, i. e., starches, celluloses, sugars such as lactose and sucrose; alcohols such as pentaerythritol, mannitol and glycerol; hydrocarbons, both aromatic and aliphatic, such as toluene and paraffin; and amines having a replaceable hydrogen. In all of the above nitrations the reaction is essentially the replacement of hydrogen by a nitro ($NO_2$) group. When this has been accomplished with nitric acid either alone or in admixture with strong water absorptive agents such as sulfuric acid, water is produced as a by-product and the general reaction may be symbolized as follows:

$$M.H + HO.NO_2 \rightarrow M.NO_2 + H_2O \quad (1)$$

where M represents the residue of the organic molecule and H is its hydrogen atom or atoms replaceable by the $NO_2$ group.

The reaction in the case of an aliphatic hydroxylated compound, for example, is believed to proceed as follows:

$$M.OH + HO.NO_2 \rightarrow M.O.NO_2 + H_2O \quad (2)$$

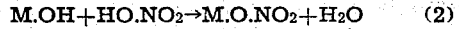

where M is the residue to which the OH group is attached. This reaction is essentially the same as (1) because it is the hydrogen of the organic molecule that is replaced by the nitro group.

It has also been proposed, on a small laboratory scale, to carry out nitrations with nitrogen pentoxide ($N_2O_5$). Nitric acid is formed as a by-product in this reaction. The general reaction symbolizing nitration with nitrogen pentoxide is:

$$M.H + N_2O_5 \rightarrow M.NO_2 + HONO_2 \quad (3)$$

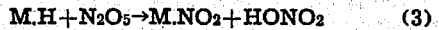

When this nitration is applied to aliphatic hydroxylated compounds the reaction is believed to proceed as follows:

$$M.OH + N_2O_5 \rightarrow M.O.NO_2 + HONO_2 \quad (4)$$

As will be seen from these reactions, the replaceable hydrogen atom or atoms in the organic compound to be nitrated combines with part of the nitrogen pentoxide to form nitric acid as the primary by-product. This nitric acid subsequently reacts with the organic compound to form water as a secondary by-product as indicated in Equations 1 or 2.

The production of water in accordance with the above prior art processes as a by-product, involves progressive dilution of the nitric acid with water during nitration. The presence of water is undesirable because, among other things, it tends to denitrate the more highly nitrated product through a hydrolysis reaction. In nitration to produce high explosives, such as highly nitrated nitric esters and nitro compounds, the water formed as a by-product must be removed to the fullest possible extent if the maximum explosive power is to be obtained from the nitrated product.

The prior art has attempted to circumvent the presence of water to the extent possible by the use of suitable water absorptive agents, such as sulfuric acid, phosphoric acid, phosphorus pentoxide or acetic anhydride. Sulfuric acid is most commonly employed and is most economical. These dehydrating agents, in order to operate efficiently must be maintained at maximum strength. A nitrating solution, however, cannot be refortified indefinitely by the additions of water absorptive agents because of the resulting undesirable increase in volume. Utlimately the nitrating solution must be withdrawn. When practiced in a large scale operation the effective disposal of the large quantities of spent acids presents a very difficult problem.

As indicative of the difficulties involved in the production of nitrations with nitric acid, it has not proved commercially feasible, using mixed nitric and sulfuric acids to nitrate cellulose to a nitrogen content in excess of 13.5%. However, cellulose trinitrate theoretically has a nitrogen content of 14.14%. In addition it is difficult to obtain uniformity in the nitrations, particularly if a continuous process is attempted, since the strength of the mixed acids necessarily changes because of the production of water during the nitration. Not only is the ultimate nitrogen content of nitrocellulose a function of the amount of water present, but the degree of nitration is very sensitive to changes in concentration as the theoretical nitrogen content is approached. This is occasioned, as explained heretofore, by the fact that a portion of initially highly nitrated cellulose may to some extent be denitrated as water is formed during the process.

Another disadvantage of the use of mixed acids in nitration, aside from the formation of water, is the production of undesirable products of sulfuric acid or other water absorptive acids with the substance to be nitrated. In the nitration of cellulose, for example, sulfuric esters of cellulose may be formed. These adversely affect the stability of the nitrocellulose unless removed by long boiling treatments. Cellulose prepared by such mixed acid treatment may require as much as 100 hours of stabilizing treatment before it is satisfactory for conversion into smokeless propellants.

Another disadvantage of the presence of water in the nitration may be the development of considerable degeneration in certain polysaccharides. Starch, for example, is extremely sensitive to hydrolytic scission and the resulting nitro product, in accordance with the prior art, is usually found to be considerably degenerated. It has been observed that degeneration of the main valence polymers impairs the viscous properties.

The basic cause of all of the disadvantages and difficulties is attributed to the formation of water as a by-product of the nitration.

In accordance with the invention, I have discovered that organic compounds may be nitrated with nitrogen pentoxide in such a way that the nitric acid formed is adsorbed and water formation is inhibited or prevented in either a primary or secondary reaction. My process, therefore, is one which is substantially anhydrous throughout and there are no undesirable effects due to the presence of water or the water absorptive acids as has been explained heretofore. The fact that in my process, water is neither produced as a primary by-product, nor allowed to be produced as a secondary by-product, overcomes the many disadvantages enumerated heretofore.

Thus inasmuch as the process is carried out without the presence of sulfuric or other water absorptive acids, there is little if any formation of esters other than the nitro compounds. Because of this fact it is relatively easy to stabilize the nitrated product, and it may be stabilized in less than five hours as compared with the long time required in mixed acid nitration. It is indeed quite probable that when nitrocellulose is prepared by my process the stabilization time may be reduced to a matter of minutes if the nitrated product is washed with the inert solvent used in the process so as to remove any of the nitrating solution that may remain on the organic material.

Another advantage of my process is attributed to the fact that inasmuch as water is not present during nitration, there is no opportunity for degradation in viscosity or body when the process is applied to form nitric esters of polysaccharides, such as cellulose, starch and related long chain polymers. In these compounds the glucosidic linkages are sensitive to hydrolytic depolymerization by the water present in the mixed acid nitration process. Thus nitric esters of cellulose of exceptionally high viscosity may be produced at any desired degree of nitration and the viscosity may be varied either by control of the initial viscosity of the cellulose, since no depolymerization occurs during nitration, or by subsequent depolymerization treatment after nitration.

In accordance with my process, nitrogen pentoxide ($N_2O_5$) is dissolved in a suitable non-aqueous inert solvent and this is contacted with the organic material to be nitrated. Nitric acid formed by reaction of the organic material with the nitrogen pentoxide is removed from the solution by means of a fluoride salt. Sodium fluoride is the cheapest of the materials available for this purpose and the invention will be further described utilizing sodium fluoride as illustrative.

By means of this process in which nitrogen pentoxide is in solution in the non-aqueous inert solvent and the sodium fluoride is insoluble in the solvent, it is possible to provide a simple means of indefinitely maintaining the purity of the nitrating solution and the only variable will be the concentration of the nitrogen pentoxide in the solvent. Even this may be eliminated as a variable by fortifying it with a solution of $N_2O_5$.

The nitrogen pentoxide and sodium fluoride need not necessarily be chemically pure compounds to be utilized in my process. However, if the purity of the final product is important, particularly for example in the manufacture of explosives, it is preferred to utilize ingredients which are as chemically pure as possible, whereby undesirable components will not enter into the reaction.

An advantage accruing from the suppression of the nitric acid by-product is the fact that nitrogen pentoxide is the sole item in the reaction with which there need be any concern. Thus, possibly owing to the behavior of nitrogen pentoxide as a gas reacting on a solid surface such as cellulose or starch, the surface concentration of the nitrogen pentoxide may remain substantially constant while the total strength or concentration of the nitrogen pentoxide in the nitrating solution may vary within relatively wide limits without appreciable effect upon the degree of nitration obtainable within these limits. In any case the practical advantages are obvious and make possible a truly continuous process of nitrating suitable materials, such as cellulose, to produce products of any desired nitrogen content.

The nitration process using the fluoride salt to remove the acid formed may be carried out conveniently by subjecting the organic material to be nitrated to contact with the nitrating solution in a batch operation, following which or even simultaneously the nitrating solution is treated with the sodium fluoride. However, the process is so well adapted to a continuous process, and continuous processes are so desirable, that this seems to be the preferable commercial form. In one such continuous process the nitrating solution may be continuously circulated, first in contact with the organic material to be nitrated and then in contact with the sodium fluoride. In this process the nitric acid, as fast as it is formed as the primary by-product in the nitration, is carried away from the organic material in the circulating liquid and the nitric acid removed by treatment with sodium fluoride before it is recontacted with the organic material. Not only may the nitrating solution be continuously moved in the manner described, but the organic material to be nitrated may also be continuously nitrated. For example the organic material may be passed continuously through a treating chamber in which the nitrating solution is continuously flowing, preferably counter-current. A series of regenerating chambers may be provided so that one may be used while another is being charged with a fresh quantity of sodium fluoride. If desired the sodium fluoride may be passed counter-currently through the regenerating chamber.

While it may be preferred to carry out the reaction in the foregoing manner, it is unnecessary to utilize more than one vessel if desired. Satisfactory results have been obtained merely by agitating a mixture of the material to be nitrated, the solution of the nitrogen pentoxide in a neutral solvent and the sodium fluoride. When the material to be nitrated, for example, toluene, is soluble in the neutral solvent, the latter technique generally will be preferred.

In view of the above explanation of the process, many ways of carrying out the nitration may be suggested to one skilled in the art and all such variations in technique are intended to be included within the scope of the present invention.

The neutral solvent, which is utilized in accordance with the invention, may be selected from many available non-aqueous solvents, such as those of coal tar, or petroleum origin. It is preferred to utilize a solvent which is not reactive with any of the other materials present, i. e., the nitrogen pentoxide, sodium fluoride, the material to be nitrated, and the nitrated product. As will be discussed more fully hereinafter, however, it is possible to utilize solvents even though they may dissolve the material to be nitrated or the nitrated products, but when possible, it is preferred to carry out the nitration with a solvent which will not dissolve the nitrated product. As specific examples, it has been found that chloroform, carbon tetrachloride or propylene dichloride may be used advantageously. In general, it is advantageous to utilize a solvent having a boiling point or range which is sufficiently high so that it can be maintained readily in the liquid phase during the nitration but sufficiently low so that it can be recovered easily from the nitrated product. Chloroform ($CHCl_3$), for example, is found to be particularly advantageous in this connection because of its boiling point of about 61.26° C. The foregoing solvents are mentioned merely by way of illustration, and it is intended that the invention shall not be limited thereto. The solvents which may be utilized cover a broad class and are well known to those skilled in the art. In view of the present disclosure, one skilled in the art may readily select a solvent suitable for the purpose intended. The neutral solvent, in addition to being a carrier for the nitrogen pentoxide, also is advantageous because it is a solvent for fats. As a result, the solvent will tend to remove undesirable fats or oils from the material to be treated, thus producing a superior product or conversely, permitting the use of starting materials of lesser purity.

The proportion of the ingredients utilized may be varied over a wide range, depending upon the conditions of operation and the results which it is desired to obtain. The theoretical amounts of the reacting ingredients, of course, may be calculated from the formulae of the reactions.

In general, it has been found convenient to dissolve the nitrogen pentoxide in the proportion of about 8 to 24 grams and preferably in the range of about 5–50 grams of nitrogen pentoxide per 100 cc. of solution. The degree of nitration appears to be more dependent upon time than upon the concentration of the nitrogen pentoxide when the initial concentration is above about 8 grams of $N_2O_5$ per 100 cc. of solution. As the nitration proceeds, additional nitrogen pentoxide may be added, if desired, to fortify and maintain the initial strength of the solution. The foregoing proportions have merely been given as illustrative and are not intended to be a limitation upon the scope of the invention.

The amount of the nitrogen pentoxide nitrating solution utilized, if desired, may be greatly in excess of the amount theoretically required for treating the materials to be nitrated in order to insure a sufficiently high reaction velocity and to cause the reaction to proceed to the desired degree. When the process is carried out continuously, an even greater amount of solution may be required to fill the system. Any larger amount may be used and it will be apparent in view of the present disclosure, that the amount is not critical and may be varied throughout a wide range without affecting the economy of the process.

The amount of sodium fluoride which may be utilized also is not critically limited. In general, it is desired to utilize sufficient sodium fluoride to insure substantially complete adsorption of the nitric acid. The amount required may depend also on the frequency with which it is replaced, and the exact process adapted. A countercurrent system should use a lesser amount. In general, it may be preferred to utilize a proportion of about 1 part of sodium fluoride to about 2 parts of the by-product nitric acid theoretically obtainable. This proportion is merely illustrative and may be varied over a wide range.

As a precautionary measure, the temperature at which the process is carried out is not too high. In general, a temperature range of the order of −20 to 35° C. is preferred, although this may vary depending upon the conditions of operation of the process. A temperature of about 0° C. to 30° C. is especially desirable. In general the higher temperatures give a higher reaction rate. The ultimate extent of nitration does not appear to be primarily dependent on the temperature.

In general, it is preferred to carry out the process in the absence of substantial pressure. It is an advantage of the present process, however, that it may be carried out in an entirely enclosed system, thus avoiding the escape of undesirable vapors.

As indicative of the degree to which the nitric acid may be removed from a solution thereof, 50 cc. of a solution of pure nitric acid in chloroform having a concentration of 1.84 grams of nitric acid per 100 cc. of solution was treated with 1 gram of sodium fluoride (technical grade—95% sodium fluoride) for 10 minutes at 10°–15° C. The sodium fluoride was removed by filtration and the concentration of the acid in the solution was determined by titration. This was found to be 0.097 gram per 100 cc. of solution. This represents an adsorption of 94.8% of the nitric acid in the solution or 87.2% of acid based on the weight of the sodium fluoride. A more complete adsorption could be obtained using a larger amount of sodium fluoride.

As indicative of the amount of acid that may be adsorbed by sodium fluoride, such as might be obtained in a continuous countercurrent operation, 40 grams of sodium fluoride were added to 2 liters of a chloroform solution containing 103 grams of pure nitric acid. After agitation for 20 minutes at room temperature, the solution was filtered and found to contain 34 grams of nitric acid, an overall adsorption of approximately 67% of the nitric acid present. The 40 grams of sodium fluoride had adsorbed 69 grams of nitric acid, or approximately 172% of its own weight.

The sodium fluoride containing the adsorbed nitric acid upon strong heating yielded copious fumes of nitrogen oxides. Sodium fluoride, after such a treatment, can be reused to adsorb additional quantities of nitric acid and the nitrogen oxides can be converted into nitrogen pentoxide and reused in the nitration process.

As indicative of the non-adsorption action of sodium fluoride upon nitrogen pentoxide, 10 cc. of a solution of nitrogen pentoxide in chloroform having a concentration of 18.21 grams of nitrogen pentoxide per 100 cc. was treated with 1 gram of dry sodium fluoride (technical grade) for 10 minutes at 10°–15° C. The sodium fluoride was removed by filtration and it was found by titration that the concentration of the pentoxide was reduced by only 10.6%, probably due to mechanical occlusions which could be avoided in a commercial adaptation of the process.

As indicative of the action of sodium fluoride in removing nitric acid from a solution containing nitrogen pentoxide in chloroform, a 1 cc. aliquot of nitrogen pentoxide solution in chloroform was titrated with 0.1N sodium hydroxide and found to require 39.0 cc. of the sodium hydroxide solution. Pure concentrated nitric acid in the amount of 0.4 cc. was added to 1 cc. of the nitrogen pentoxide solution and a 1 cc. aliquot was titrated with the same sodium hydroxide solution and found to require 40.13 cc. of the hydroxide solution. The nitrogen pentoxide and nitric acid solution was then treated for 10 minutes at 10°–15° C. with 1 gram of sodium fluoride, after which it was found that a 1 cc. aliquot portion of the thus treated solution required 38.55 cc. of the 0.1N sodium hydroxide solution for neutralization.

As indicative of the use of sodium fluoride in removing nitric acid fumes, 5 grams of sodium fluoride was spread upon a mat of glass wool on a Buchner funnel fitted into a flask containing 10 grams of concentrated nitric acid. The flask was gently warmed while a watch glass was loosely fitted over the top of the funnel. After 1 hour the funnel was inserted into a filtering flask and a current of air was sucked through the fluoride. It was then thoroughly washed with chloroform to remove any occluded acid and transferred to a flask where it was shaken with 95 cc. of cold water and the solution titrated with 0.1N sodium hydroxide. It was found that 2.5 grams of nitric acid was taken up by the fluoride, or about 50% based on the original weight of the sodium fluoride.

As an example of the nitration of starch by N₂O₅ in chloroform using sodium fluoride as adsorbent for nitric acid, 50 grams of oven-dried corn starch were added to 1500 cc. of a chloroform solution containing 13.67 g. N₂O₅ per 100 cc. and in which 20 grams of sodium fluoride were dispersed. The nitration of the starch was carried on for 15 minutes, under good agitation, at an average temperature of 7° C. The nitrating solution was then removed by filtration, and the mixture of nitrostarch and sodium fluoride with adsorbed by-product nitric acid, was rinsed in chloroform and dispersed in water for solution of the fluoride-nitric acid complex and stabilization of the nitrostarch. The nitrogen content of the nitrostarch was 13.91%.

The use of sodium fluoride was found to be similarly applicable and efficient for the nitration of cellulose, as for any other nitration in which a hydrogen atom is displaced.

The invention is also applicable to processes other than the above described nitration process. In the conventional production of a carbohydrate glycollic acid ether, this is accomplished by reacting the starch with chloracetic acid in the presence of an alkaline material. The overall reaction may be viewed as follows:

R—OH+ClCH₂COOH+NaOH→
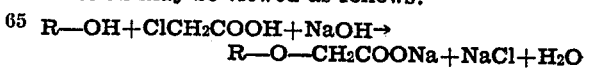
R—O—CH₂COONa+NaCl+H₂O

The carbohydrate may be starch or cellulose, where R represents the residue to which may be attached any number of hydroxyl groups. The sodium salt must be reconverted to the acid if the acid form is desired. In the above process the hydrogen from the hydroxy group of the starch and the chlorine from the chloracetic acid is thought to combine to form hydrochloric acid.

This reaction does not proceed either at a desirable rate or to a desirable equilibrium point unless the hydrochloric acid is removed. This is done by means of a base such as sodium hydroxide. In other modifications lime has been used to neutralize the hydrochloric acid formed. The presence of the base, however, has the result of converting the acid compound to the corresponding salt.

In accordance with my process the hydrochloric acid formed is adsorbed by the sodium fluoride, thereby permitting the reaction to go to a desirable equilibrium point. It may be viewed as follows:

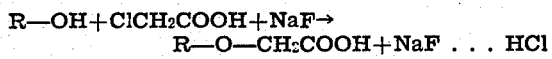

Another process utilizing the applicability of the invention is the production of a carbohydrate, such as cellulose or starch, hydroxy ethyl ether. This may be carried out in accordance with the following reaction:

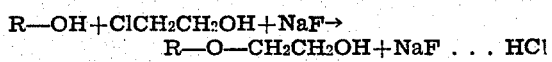

The process may be carried out by dissolving either the chloracetic acid or the ethylene chlorhydrin and an inert solvent and mixing this with the carbohydrate in the presence of sodium fluoride. The sodium fluoride may be mixed with the carbohydrate, and after the reaction is completed the sodium fluoride containing the adsorbed hydrogen fluoride may be washed from the carbohydrate.

The amount of the sodium fluoride used in the process may be readily determined from its measured ability to absorb the hydrogen chloride with reference to the amount of the reacting materials and the amount of the hydrogen chloride formed in the process.

In addition to the advantages mentioned, another advantage of the process is the ability to react a larger number of hydroxyl groups of the carbohydrate and thus effect a more etherified product.

As illustrative of the action of sodium fluoride in adsorbing hydrogen chloride, aqueous vapors of hydrogen chloride from gently warmed concentrated aqueous hydrochloric acid were passed through 1 gram of dried sodium fluoride. Subsequent titration of an aqueous solution of the fluoride showed an adsorption of 170 milligrams or approximately 17% of hydrochloric acid based on the sodium fluoride. Dry hydrogen chloride similarly is adsorbed by sodium fluoride. Dry hydrogen chloride was produced by the addition of concentrated hydrochloric acid to concentrated sulfuric acid, and was passed through 1 gram of sodium fluoride. The adsorption was determined by subsequent titration of an aqueous solution of the fluoride. This showed an adsorption of approximately 9% of dry hydrogen chloride based on the weight of the fluoride.

Hydrogen chloride in solution of chloroform, such as could be present in the etherifications referred to above, was prepared by forming a saturated solution of dried hydrogen chloride in chloroform. 50 cc. of this anhydrous solution was treated with 1 gram of dried sodium fluoride for 10 minutes at 10°–15° C. The fluoride was removed by filtration and it was found that the adsorption was 98.5% of the hydrogen chloride in the solution, or approximately 22% based on the weight of the sodium fluoride.

Without wishing to be bound by any theory as to the results obtained, the following explanation may be of assistance in understanding the invention.

It is thought that the sodium fluoride holds the acid through the so-called "hydrogen bond" or "coordinate" linkage, sometimes referred to as a secondary valence. The fluorine atom being strongly electronegative acts as a proton acceptor and the hydrogen in the acid is attracted to the fluorine and held through ionic forces. This explains why nitric acid, for example, which contains hydrogen may combine with the fluorides through a so-called secondary valence, whereas nitrogen pentoxide, which does not contain hydrogen, does not. The hydrogen bonded complex of the fluoride and the acid presumably, therefore, may be viewed as Na—F . . . H—O—NO₂ or Na—F . . . H—Cl, where the full dash indicates a primary valence and where the dotted dash indicates the so-called hydrogen bond or secondary valence.

The phenomena described is referred to as an adsorption, and this is not intended to mean a strictly physical relationship between the acid and the fluoride. The word is used as generic to a physical or chemical union, or a combination thereof, particularly the possible chemical complex involving the phenomena of the so-called hydrogen bonds.

In describing the applicability of my invention, I have illustrated it with the use of sodium fluoride merely for convenience because of its availability, low cost, practicality, and efficiency. It is to be understood, however, that certain other fluorides may be used, such as zinc fluoride, magnesium fluoride, potassium fluoride, ammonium fluoride, etc. The words "fluoride salt" are intended to be generic to fluorides of these metals.

In view of the foregoing disclosure, many variations in the carrying out of the present invention may be suggested to one skilled in the art, and all such variations are intended to be included within the scope of the invention.

I claim:

1. A process of nitrating a material capable of being nitrated by replacement of hydrogen therein with a nitro group, which comprises treating the material with nitrogen pentoxide dissolved in a non-aqueous solvent in the proportion of about 5 to 50 grams of nitrogen pentoxide to 100 cc. of solution, maintaining a temperature of about 0° C. to 30° C. during the nitration, and contemporaneously bringing the solution into contact with sodium fluoride.

2. A process of nitrating a material capable of being nitrated by replacement of hydrogen therein with a nitro group, which comprises reacting the material with nitrogen pentoxide dissolved in a non-aqueous solvent, maintaining a temperature of less than about 30° C. during the nitration and contemporaneously eliminating nitric acid from the solution with sodium fluoride.

3. A process of nitrating a material capable of being nitrated by replacement of hydrogen therein with a nitro group, which comprises treating the material with nitrogen pentoxide dissolved in a non-aqueous solvent, said treatment being carried out in the presence of a fluoride salt.

4. A process of nitrating a material capable of being nitrated by replacement of hydrogen therein with a nitro group, which comprises forming a solution of nitrogen pentoxide in a non-aqueous solvent, and bringing said solution into contact with the material and with a fluoride salt.

5. A continuous process of nitrating a material capable of being nitrated by replacement of hydrogen therein with a nitro group, which comprises forming a solution of nitrogen pentoxide in a non-aqueous solvent, and continuously circulating and recycling said solution successively through the material and a fluoride salt.

6. A process of nitrating a material capable of being nitrated by replacement of hydrogen therein with a nitro group, which comprises treating a mixture of the material with a solution of nitrogen pentoxide in chloroform and contemporaneously eliminating nitric acid from the solution by treatment with sodium fluoride.

7. A substantially anhydrous process of nitrating carbohydrates whereby hydrolytic degeneration of the carbohydrates during nitration is substantially avoided which comprises treating the carbohydrate to be nitrated with a solution of nitrogen pentoxide dissolved in a non-aqueous solvent, and during said treatment of the carbohydrate, eliminating nitric acid from the solution by treatment with a fluoride salt.

8. A process of nitrating cellulose which comprises contacting a solution of nitrogen pentoxide in a non-aqueous solvent with cellulose and with a fluoride salt.

9. A process of nitrating starch which comprises contacting a solution of nitrogen pentoxide in a non-aqueous solvent with starch and with a fluoride salt.

10. A substantially anhydrous process of preparing nitrocellulose of improved physical properties which comprises treating cellulose with a solution of nitrogen pentoxide in chloroform, and eliminating the nitric acid formed upon nitration by contacting the solution with sodium fluoride.

11. A substantially anhydrous process of preparing nitrostarch of improved physical properties which comprises treating starch with a solution of nitrogen pentoxide in chloroform, and eliminating the nitric acid formed upon nitration by contacting the solution with sodium fluoride.

12. In a chemical process of forming carbohydrate ethers by a reaction of a carbohydrate with a halogenated compound involving the removal of a hydrogen to form a hydrohalide acid as a by-product, which comprises reacting said carbohydrate and halogen compound in the presence of a fluoride salt.

13. A process of forming a carbohydrate ether by reacting a carbohydrate with the halogenated compound of the radical to be combined through the oxygen of the carhohydrate, which comprises reacting said carbohydrate and halogen compound in the presence of a fluoride salt to adsorb the hydrohalide by-product acid.

14. A process of forming starch glycollic acid ether, which comprises reacting starch and chloracetic acid in the presence of sodium fluoride.

15. A process of forming starch hydroxy ethyl ether which comprises reacting starch and ethylene chlorhydrin in the presence of sodium fluoride.

16. In substantially anhydrous chemical reactions involving the replacement of hydrogen in a carbohydrate by a substituent from another compound reactive therewith to form a carbohydrate derivative as a primary reaction product, and as a by-product a strong inorganic acid selected from the group consisting of hydrochloric acid and nitric acid, introducing a fluoride salt into the zone of the reaction and adsorbing said inorganic acid by means of said fluoride salt, and separating the primary reaction product from the fluoride salt and the adsorbed inorganic acid.

17. In substantially anhydrous chemical reactions involving the replacement of hydrogen in a carbohydrate by a substituent from another compound reactive therewith to form a carbohydrate derivative as a primary reaction product, and as a by-product a strong inorganic acid selected from the group consisting of hydrochloric acid and nitric acid, introducing sodium fluoride into the zone of the reaction and adsorbing said inorganic acid by means of said sodium fluoride, and separating the primary reaction product from the sodium fluoride and the adsorbed inorganic acid.

18. Processes of reacting a carbohydrate in a substantially anhydrous reaction in which the hydrogen atom of a hydroxyl group is substituted, and there is liberated as a by-product a strong inorganic acid selected from the group consisting of hydrochloric acid and nitric acid, characterized by carrying out the reaction in the presence of a fluoride salt to adsorb the strong inorganic by-product.

GEORGE V. CAESAR.

REFERENCES CITED

The following references are of record in the file of this patent:

UNITED STATES PATENTS

| Number | Name | Date |
| --- | --- | --- |
| 2,314,212 | Hennion | Mar. 16, 1943 |
| 1,138,916 | Weyel | May 11, 1915 |

OTHER REFERENCES

Chem. Abstracts, vol. 31, p. 44388.